United States Patent
Balaya et al.

(10) Patent No.: US 9,385,367 B2
(45) Date of Patent: Jul. 5, 2016

(54) APPROACH FOR MANUFACTURING EFFICIENT MESOPOROUS NANO-COMPOSITE POSITIVE ELECTRODE LIMN1-XFEXPO4 MATERIALS

(75) Inventors: Palani Balaya, Singapore (SG); Vishwanathan Ramar, Singapore (SG)

(73) Assignee: National University of Singapore, Singapore (SG)

( * ) Notice: Subject to any disclaimer, the term of this patent is extended or adjusted under 35 U.S.C. 154(b) by 130 days.

(21) Appl. No.: 14/128,433

(22) PCT Filed: Jun. 27, 2012

(86) PCT No.: PCT/SG2012/000228
§ 371 (c)(1),
(2), (4) Date: Dec. 20, 2013

(87) PCT Pub. No.: WO2013/002730
PCT Pub. Date: Jan. 3, 2013

(65) Prior Publication Data
US 2014/0134490 A1     May 15, 2014

Related U.S. Application Data

(60) Provisional application No. 61/501,346, filed on Jun. 27, 2011.

(51) Int. Cl.
| | |
|---|---|
| *H01M 4/36* | (2006.01) |
| *C01B 25/45* | (2006.01) |
| *H01M 4/58* | (2010.01) |
| *H01M 4/04* | (2006.01) |
| *H01M 4/02* | (2006.01) |

(52) U.S. Cl.
CPC ............ *H01M 4/366* (2013.01); *C01B 25/45* (2013.01); *H01M 4/04* (2013.01); *H01M 4/0471* (2013.01); *H01M 4/5825* (2013.01); *H01M 2004/021* (2013.01)

(58) Field of Classification Search
CPC ..... H01M 4/366; H01M 4/0471; H01M 4/04; H01M 4/5825; H01M 2004/021; C01B 25/45
See application file for complete search history.

(56) References Cited

FOREIGN PATENT DOCUMENTS

| CN | 1821182 | * | 8/2006 | ............... C01B 31/02 |
|---|---|---|---|---|
| CN | 101041428 | * | 9/2007 | ............... C01B 31/02 |
| WO | WO-2007100918 A2 | | 9/2007 | |
| WO | WO-2007113624 A1 | | 10/2007 | |
| WO | WO 2008/067677 | * | 6/2008 | ............... H01M 4/58 |
| WO | WO-2008/067677 A1 | | 6/2008 | |
| WO | WO-2010046629 A1 | | 4/2010 | |
| WO | WO 2011/048149 | * | 4/2011 | ............... C23C 18/12 |

OTHER PUBLICATIONS

Wang et al. Advanced Materials vol. 22 No. 44 2010 pp. 4944-4948.*

* cited by examiner

*Primary Examiner* — Patrick Ryan
*Assistant Examiner* — Aaron Greso
(74) *Attorney, Agent, or Firm* — Cesari and McKenna LLP

(57) ABSTRACT

A process of preparing mesoporous nano-composite $LiMn_{1-x}Fe_xPO_4$ ($0 \leq x \leq 1$, e.g., $x=0$, 0.2, 0.5 and 0.8) particles. The process contains the steps of providing a mixture of a soft-template compound, a lithium ion-containing compound, an iron ion-containing compound, a manganese ion-containing compound, and a phosphate ion-containing compound in a solvent, removing the solvent to obtain a $LiMn_{1-x}Fe_xPO_4$ precursor, and calcining the precursor followed by milling and annealing. Also disclosed is a mesoporous nano-composite $LiMn_{1-x}Fe_xPO_4$ particle prepared by this process.

18 Claims, No Drawings

APPROACH FOR MANUFACTURING EFFICIENT MESOPOROUS NANO-COMPOSITE POSITIVE ELECTRODE LIMN1-XFEXPO4 MATERIALS

CROSS-REFERENCE TO RELATED APPLICATIONS

This application is the National Stage of International Application No. PCT/SG2012/000228 filed on Jun. 27, 2012, which claims the benefit of U.S. Provisional Application No. 61/501,346 filed on Jun. 27, 2011. The contents of both applications are hereby incorporated by reference in their entirety.

BACKGROUND

Lithium ion batteries are among the most effective energy storage systems. They have been used in many electronic devices and are expected to play prominent roles in the next generation hybrid and plug-in-hybrid electric vehicles. Essential to the performance of these batteries are active electrode materials capable of reversibly exchanging lithium ions, especially positive electrode materials. $LiMn_{1-x}Fe_xPO_4$ ($0 \le x \le 1$) particles are promising cathode materials that offer high energy density and high power density. See Padhi et al., Journal of the Electrochemical Society, 144, 1188-94 (1997); Saravanan et al., Energy & Environmental Science, 3, 457-64 (2010); and Drezen et al., Journal of Power Sources, 174, 949-53 (2007).

The performance of $LiMn_{1-x}Fe_xPO_4$ particles is largely affected by their conductivities and their sizes. See Drezen et al., Journal of Power Sources, 174, (2), 949-953 (2007); and Doan et al., Advanced Powder Technology, 21, 187-96 (2010). Several processes have been developed to prepare $LiMn_{1-x}Fe_xPO_4$ particles. For example, solid state reactions/ball milling processes have been used to prepare $LiMn_{1-x}Fe_xPO_4$ particles in reasonable yields. See Martha et al., Angewandte Chemie International Edition, 48, 8559-63 (2009). However, these reactions consume a significant amount of energy due to their long calcination time and high calcination temperature, making them uneconomical in mass production.

There is a need to develop a process that is suitable for mass production of efficient $LiMn_{1-x}Fe_xPO_4$ materials, in particular, mesoporous nano-composite particles.

SUMMARY

This disclosure is based on the discovery of a process that is suitable for mass production of high performance mesoporous nano-composite $LiMn_{1-x}Fe_xPO_4$ particles ($0 \le x \le 1$, e.g., x=0, 0.2, 0.5 and 0.8).

Accordingly, one aspect of this disclosure relates to a process of preparing mesoporous nano-composite $LiMn_{1-x}Fe_xPO_4$. The process includes the steps of (a) providing a solvent containing a soft-template compound, a lithium ion-containing compound, an iron ion-containing compound, a manganese ion-containing compound, and a phosphate ion-containing compound; (b) removing the solvent to obtain a $LiMn_{1-x}Fe_xPO_4$ precursor; (c) calcining the $LiMn_{1-x}Fe_xPO_4$ precursor to obtain crystalline $LiMn_{1-x}Fe_xPO_4$ grains; (d) milling the crystalline $LiMn_{1-x}Fe_xPO_4$ grains in the presence of conductive carbon to obtain nanostructured $LiMn_{1-x}Fe_xPO_4/C$ particles; and (e) annealing the nanostructured $LiMn_{1-x}Fe_xPO_4/C$ particles to obtain mesoporous nano-composite $LiMn_{1-x}Fe_xPO_4/C$ particles.

In step (a), the solvent can be a mixture of ethanol and water, in which the weight ratio of ethanol to water is 1:1 to 6:1 (e.g., 5:1); the soft-template compound can be dodecyltrimethyl-ammonium bromide, (1-hexadecyl)trimethylammonium bromide, octadecyl-trimethylammonium bromide, tetradecyltrimethylammonium bromide, decyltrimethylammonium bromide, octyl-trimethylammonium bromide, or pluronic F-127 (e.g, (1-hexadecyl)trimethyl-ammonium bromide and dodecyltrimethylammonium bromide); the lithium ion-containing compound can be lithium dihydrogen phosphate, lithium acetate, lithium carbonate, lithium hydroxide, or lithium nitrate (e.g., lithium dihydrogen phosphate); the iron ion-containing compound can be iron (II) acetate, iron (III) nitrate, iron (III) acetylacetonate, iron (III) chloride, or iron (II) oxalate (e.g., iron (II) acetate); the manganese ion-containing compound can be manganese (II) acetate, manganese (III) nitrate, manganese (III) acetylacetonate, manganese (III) chloride, or manganese (II) oxalate (e.g., manganese (II) acetate); and the phosphate ion-containing compound can be lithium dihydrogen phosphate, ammonium dihydrogen phosphate, or phosphoric acid (e.g., lithium dihydrogen phosphate). The amounts of the lithium ion-containing compound, the ferrous ion-containing compound, the manganese ion-containing compound, and the phosphate ion-containing compound are in stoichiometric proportion (e.g., 1:(1-x):x:1 by mole). The weight ratio of the soft-template compound to the lithium ion-containing compound is 1:1 to 10:1.

The $LiMn_{1-x}Fe_xPO_4$ precursor obtained in step (b) can be calcined in step (c) at 550 to 750° C. for 2 to 12 hours, e.g., at 600 to 700° C. for 3 to 6 hours, to afford crystalline $LiMn_{1-x}Fe_xPO_4$ grains.

In step (d), the crystalline $LiMn_{1-x}Fe_xPO_4$ grains can be ball milled to obtain nanostructured $LiMn_{1-x}Fe_xPO_4/C$ particles at 300 to 600 rpm in the presence of conductive carbon for 2 to 24 hours, e.g., at 300 to 500 rpm for 2 to 6 hours.

In step (e), the nanostructured $LiMn_{1-x}Fe_xPO_4$ particles can be annealed to yield mesoporous nano-composite $LiMn_{1-x}Fe_xPO_4/C$ particles at 300 to 750° C. for 2 to 12 hours, e.g., at 500 to 700° C. for 3 to 6 hours.

Another aspect of this disclosure relates to a mesoporous nano-composite $LiMn_{1-x}Fe_xPO_4$ particle prepared by the above-described process.

Still within the scope of this disclosure is a mesoporous nano-composite $LiMn_{1-x}Fe_xPO_4$ particle containing phospho-olivine $LiMn_{1-x}Fe_xPO_4$ crystals and a uniform carbon coating on the surface of the particles. The particle has a particle size of 10 to 100 nm (e.g., 50-80 nm), a surface area of 30 to 50 $m^2g^{-1}$ (e.g., 40 to 50 $m^2g^{-1}$), and a pore size of 3 to 40 nm (e.g., 3 to 30 nm). The carbon coating has an average thickness of 1 to 10 nm (e.g., 3 to 7 nm).

The details of one or more embodiments of the disclosure are set forth in the description below. Other features, objects, and advantages of the invention will be apparent from the description and the claims.

DETAILED DESCRIPTION

This disclosure provides a cost effective process for preparing mesoporous nano-composite $LiMn_{1-x}Fe_xPO_4$ ($0 \le x \le 1$) particles employing easy scalable soft-template synthesis followed by simple re-engineering.

The process includes steps (a) to (e). See the Summary section above. Each step is described in detail below.

Step (a)

A mixture is provided in this first step of soft-template synthesis of the mesoporous nano-composite $LiMn_{1-x}Fe_xPO_4$ particles. The mixture includes a soft-template compound, a lithium ion-containing compound, an iron ion-containing compound, a manganese ion-containing compound, a phosphate ion-containing compound, and a solvent at a predetermined weight ratio. The mixture can be a solution or a slurry. Preferably, it is a solution in which these compounds are dissolved in the solvent. When the mixture is a slurry, the compounds are dispersed in the solvent and mixed well with each other. It is preferred that the compounds are at a stoichiometric molar ratio, e.g., Li:Mn:Fe:PO$_4$=1:(1-x):x:1.

The mixture is then stirred at a predetermined temperature (e.g., room temperature or an elevated temperature) for an adequate duration to allow formation of LiMn$_{1-x}$Fe$_x$PO$_4$ nanocrystals that are coated with the soft-template compounds. Without being bound by any one theory, the mechanism for forming the nanocrystals is described in Balaya et. al., the International Patent Application Publication, WO 2012/023904.

The soft-template compound, usually a carbon-containing surfactant or a cationic surfactant, is a compound that can self-assemble into micelles at its critical micellar concentration. These micelles can provide micro or meso pores for the growth of LiMn$_{1-x}$Fe$_x$PO$_4$ nanocrystals and can also restrict them from overgrowth. The soft-template compound can be a surfactant for providing suitable micelle morphology and size for growing LiMn$_{1-x}$Fe$_x$PO$_4$ nanocrystals. Examples include, but are not limited to, (1-dodecyl)trimethylammonium bromide, (1-hexadecyl)trimethylammonium bromide, octadecyltrimethylammonium bromide, tetradecyltrimethylammonium bromide, decyltrimethylammonium bromide, octyltrimethyl ammonium bromide, trimethyloctadecylammonium chloride, docosyltrimethylammonium chloride, pluronic P-123, pluronic F127, pluronic F 68, and a combination thereof. The concentration of the soft-template compound in the solvent is 0.001 to 0.2 mol/L (e.g., 0.005 to 0.15 mol/L). The weight ratio of the soft-template compound to the lithium ion-containing compound described below is 1:1 to 10:1 (e.g., 6:1).

The lithium ion-containing compound, the iron ion-containing compound, the manganese ion-containing compound, and the phosphate ion-containing compound are the sources for the lithium ions, the iron ions, the manganese ions, and the phosphate ions that form the LiMn$_{1-x}$Fe$_x$PO$_4$ nanocrystals. These compounds can be provided in a powder or particulate form. Hydrates of these compounds, if available, can also be used. These materials are well known in the field of chemistry.

The lithium ion-containing compound can be an ionic compound of lithium, e.g., an organic lithium salt, an inorganic lithium salt, and lithium hydroxide. Examples include, but are not limited to, lithium fluoride, lithium chloride, lithium bromide, lithium iodide, lithium nitrate, lithium nitrite, lithium sulfate, lithium hydrogen sulfate, lithium sulfite, lithium bisulfite, lithium carbonate, lithium bicarbonate, lithium borate, lithium phosphate, lithium dihydrogen phosphate, lithium hydrogen ammonium phosphate, lithium dihydrogen ammonium phosphate, lithium silicate, lithium antimonate, lithium arsenate, lithium genninate, lithium oxide, lithium salts with carboxylic acids (e.g., acetate and oxalate) or hydroxyl carboxylic acids (e.g., glycolate, lactate, citrate, and tartrate), lithium alkoxide, lithium enolate, lithium phenoxide, lithium hydroxide, and a combination thereof.

The iron ion-containing compound and the manganese ion-containing compound can be ionic compounds, e.g., organic and inorganic salts. Examples include, but are not limited to, iron and manganese fluorides, chlorides, bromides, iodides, acetyl acetonates, nitrates, nitrites, sulfates, hydrogen sulfates, sulfites, bisulfites, carbonates, bicarbonates, borates, phosphates, hydrogen ammonium phosphates, dihydrogen ammonium phosphates, oxide bis(2,4-pentanadionate), sulfate oxides, silicates, antimonates, arsenates, germanates, oxides, hydroxides, carboxylates, alkoxides, enolates, phenoxides, and a combination thereof. Note that each of the iron and manganese ions in these compounds may have an oxidation state that is different from that found in the LiMn$_{1-x}$Fe$_x$PO$_4$ product. Oxidizing or reducing conditions can be applied to bring the oxidation state of the starting ions to that found in the final product. For example, the soft-template reaction can be carried out in a reducing atmosphere such as hydrogen, ammonia, and methane. See Balaya et al., WO 2012/023904 A1.

Examples of the phosphate ion-containing compound include, but are not limited to, alkali metal phosphates, alkaline metal phosphates, transition metal phosphates, and non-metal phosphates (e.g., phosphoric acid, ammonium dihydrogen phosphate, ammonium hydrogen phosphate, and ammonium phosphate), and a combination thereof.

A compound containing two or more of lithium, iron, manganese, and phosphate ions can be used. For example, lithium dihydrogen phosphate can be used to provide both lithium ions and phosphate ions.

The solvent can be an inorganic or organic solvent. Examples include, but are not limited to, water, methanol, ethanol, propanol, butanol, hexanol, or a combination thereof. A preferred solvent is a mixture of ethanol and water.

Turning back to the mixture, it can be stirred to allow complete dissolution or homogeneous dispersion of the compounds. LiMn$_{1-x}$Fe$_x$PO$_4$ nanocrystals may be formed in and precipitated from the mixture during the stirring.

Step (b)

The solvent is removed (e.g., by evaporation at an elevated temperature, by filtration, and by centrifuge) from the mixture to obtain a LiMn$_{1-x}$Fe$_x$PO$_4$ precursor. The LiMn$_{1-x}$Fe$_x$PO$_4$ precursor contains LiMn$_{1-x}$Fe$_x$PO$_4$ nanocrystals, which are formed by stirring the mixture of step (a) or by removing solvent in this step.

Step (c)

The LiMn$_{1-x}$Fe$_x$PO$_4$ precursor thus obtained is calcined to obtain crystalline LiMn$_{1-x}$Fe$_x$PO$_4$ grains. The calcination is carried out at a high temperature (e.g., 550 to 750° C., 600 to 700° C., and 650° C.) for an adequate duration (e.g., 2 to 12 hours, 3 to 6 hours, and 4 hours). The crystalline LiMn$_{1-x}$Fe$_x$PO$_4$ grains thus obtained have mesopores in nano sizes (e.g., 3-30 nm). The mesopores are formed between two or more adjacent LiMn$_{1-x}$Fe$_x$PO$_4$ nanocrystals. The sizes of the mesopores can be controlled by the calcination temperature and the milling conditions, which will be described below. During the calcination, the soft-template compound on the surface of the nanocrystals is decomposed to form a carbon coating in a thickness of 1 to 10 nm (e.g., 2 to 5 nm).

Preferably, the above-described calcining step is conducted under an essentially non-oxidizing atmosphere, such as vacuum and inert gas (e.g., nitrogen, helium, and argon with or without hydrogen).

Step (d)

The crystalline LiMn$_{1-x}$Fe$_x$PO$_4$ grains are ball milled to obtain nanostructured LiMn$_{1-x}$Fe$_x$PO$_4$ particles. The ball milling speed (e.g., 300 to 600 rpm), time (e.g., 2 to 24 hours), and ball to grain weight ratio (e.g., 10:1 to 50:1, preferably 20:1 to 40:1) are optimized to afford the final nanoparticles in the size below 100 nm (e.g., 10 to 100 nm, preferably 50 to 80 nm).

It is preferred that the ball milling is conducted in the presence of conductive carbon. The amount of the conductive carbon can be added to the crystalline grains so that the nanoparticles after ball milling are coated with conductive carbon in a thickness of 1 to 10 nm (e.g., 3 to 7 nm). Examples of conductive carbon include, but are not limited to, acetylene black, conductive carbon black (e.g., Printex XE2, Black Pearls 2000, and Ketjenblack), carbon nanotubes (e.g., single-walled carbon nanotubes and multi-walled carbon nanotubes), and graphitic nano-sheets.

Step (e)

After ball milling, the nanostructured $LiMn_{1-x}Fe_xPO_4$ particles are annealed to yield mesoporous nano-composite $LiMn_{1-x}Fe_xPO_4$ particles. The annealing can be conducted at 300 to 750° C. (e.g., 500-700° C.) for 2 to 24 hours (e.g., 3 to 6 hours). Annealing removes lattice strains developed during the high energy milling and restores crystallanity lost also during the milling without affecting the crystallite size (e.g., 50 to 80 nm). Lattice strains and crystallanity loss negatively affect the electroactivities of the $LiMn_{1-x}Fe_xPO_4$ nanoparticles.

The mesoporous nano-composite $LiMn_{1-x}Fe_xPO_4$ particles thus obtained have a phospho-olivine crystal structure, a particle size of 10 to 100 nm (e.g., 50 to 80 nm), a surface area of 30 to 50 $m^2g^{-1}$ (e.g., 40 to 50 $m^2g^{-1}$), and a pore size of 3 to 40 nm (e.g., 3 to 30 nm).

The above-described process provides (i) homogeneous mixing of the reactants thereby avoiding any non-stoichiometry, (ii) high degree of crystallinity, (iii) control over particle size and pore size, (iv) in-situ coating of conductive carbon onto the surface of $LiMn_{1-x}Fe_xPO_4$ particles, (v) improved kinetics of ions and electrons, (vi) strengthening of conductive carbon coated on the surface of the particles during reheating, (vii) reliving of the lattice strain created during milling using reheating process, and (viii) opportunities to make a product more crystalline during annealing.

Furthermore, this process eliminates problems associated with inherently poor kinetics of $LiMn_{1-x}Fe_xPO_4$ materials made by other processes such as solid phase synthesis. The ball milling and annealing steps of this process can enhance the lithium ionic diffusion, the electronic diffusion, and the crystallanity of the mesoporous nano-composite $LiMn_{1-x}Fe_xPO_4$ particles. In sum, the $LiMn_{1-x}Fe_xPO_4/C$ particles prepared by this process offer increased energy storage and power density, which are critical for hybrid and electric vehicles.

A person skilled in the art can determine without undue experimentation the types and amounts of solvent, the lithium ion-containing compound, the manganese ion-containing compound, the iron ion-containing compound, and the phosphate ion-containing compound. The skilled artisan can also determine other conditions, such as calcination temperature, milling speed, ball to grain weight ratio, and annealing time.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

EXAMPLE 1

Preparation of Mesoporous Nano-Composite $LiMn_{0.2}Fe_{0.8}PO_4$ Particles

Mesoporous nano-composite $LiMn_{0.2}Fe_{0.8}PO_4$ particles were synthesized using the easy scalable soft-template method followed by high energy ball milling with conductive carbon and mild annealing. First, (1-hexadecyl)trimethylammonium bromide (3.64 grams, used as a soft-template compound) was dissolved in a mixture of ethanol and water (120 milliliters, ethanol/water: 5/1 by volume). To the surfactant solution were added lithium dihydrogen phosphate (0.6 grams, as an ion source of both lithium ions and phosphate ions), manganese acetate tetrahydrate (0.2828 grams, as a manganese ion-containing compound), and iron (II) acetate (0.8033 grams, as an iron ion-containing compound). The resulting mixture was stirred at ambient temperature for 12 hours. The solvent was removed using roto-evaporator at 80° C. to obtain a $LiMn_{0.2}Fe_{0.8}PO_4$ precursor. The precursor was calcined at 650° C. for 6 hours to yield crystalline $LiMn_{0.2}Fe_{0.8}PO_4$ grains. The crystalline grains, to which was added conductive carbon (0.15 to 0.5 grams), were ball-milled at a rotary speed of 500 rpm for 4 hours. After ball milling, the milled particles were annealed at 500° C. for 3 hours to yield mesoporous nano-composite $LiMn_{0.2}Fe_{0.8}PO_4$ particles. The annealing made the particles more crystalline and removed lattice strains developed during the high energy ball milling. The particles thus obtained in general had a size of 50-80 nm.

EXAMPLE 2

Preparation of Mesoporous Nano-Composite $LiMn_{0.5}Fe_{0.5}PO_4$ Particles, $LiMn_{0.8}Fe_{0.2}PO_4$ Particles, and $LiMnPO_4$ Particles Mesoporous nano-composite $LiMn_{0.5}Fe_{0.5}PO_4$ particles, $LiMn_{0.8}Fe_{0.2}PO_4$ particles, and $LiMnPO_4$ particles were synthesized using the same procedures as described in Example 1 except for the amounts of the reactants. The reactant weights are listed in Table 1 below.

TABLE 1

The weights of the compounds used to synthesize mesoporous $LiMn_{1-x}Fe_xPO_4$ particles

| $LiMn_{1-x}Fe_xPO_4$ | $LiH_2PO_4$ grams | $Mn(OAc)_2$ grams | $Fe(OAc)_2$ grams | Cationic surfactant grams | Water-ethanol, 5:1, v/v mL |
|---|---|---|---|---|---|
| $LiMn_{0.5}Fe_{0.5}PO_4$ | 0.6 | 0.7072 | 0.5020 | 3.64 | 120 |
| $LiMn_{0.8}Fe_{0.2}PO_4$ | 0.6 | 1.1315 | 0.2008 | 3.64 | 120 |
| $LiMnPO_4$ | 0.6 | 1.4144 | — | 3.64 | 120 |

EXAMPLE 3

Characterization of Mesoporous Nano-Composite $LiMn_{1-x}Fe_xPO_4$ Particles

The particles were subjected to X-ray diffraction ("XRD") structural analysis. The XRD patterns show a single crystal form (i.e., orthorhombic structure) of the particles prepared in Examples 1 and 2.

Furthermore, images of these particles were taken using a field emission scanning electron microscopy (FESEM) and a transmission electron microscopy (TEM). The surface area and the pore size distribution were measured using a BET and surface analyzer by performing $N_2$ adsorption and desorption experiments. The particles were shown to have a particle size of 50-80 nm, a surface area of 35-50 $m^2g^{-1}$, and a pore size of 3-27 nm.

EXAMPLE 4

Electrochemical Performance of Mesoporous Nano-Composite $LiMn_{1-x}Fe_xPO_4$ Particles In order to estimate the lithium storage performance of the $LiMn_{1-x}Fe_xPO_4$ particles, cathodic electrodes were fabricated with the active material, acetylene carbon black and binder (Kynar 2801) in the weight ratio of 80:10:10, 75:15:10 or 65:25:10. N-methyl pyrrolidone (NMP) was used as the solvent. Cathodic electrodes which had a thickness of 10 μm and a geometrical area of 2.01 cm² were prepared using an etched aluminum foil as the current collector. Coin-type cells (size 2016) were assembled in an Argon-filled glove box, using each of the above-described cathodic electrodes, a lithium metal foil as the negative electrode, 1 mol/L $LiPF_6$ in the mixture of ethylene carbonate and diethyl carbonate (1:1, v/v) or a mixture of ethylene carbonate and dimethyl carbonate (1:1, v/v) as the electrolyte, and a Whatman glass microfiber filter (Grade GF/F) or a Celgard 2502 membrane as the separator. The cells were aged for 12 hours before a test. Charge-discharge cycling at a constant current was carried out using a battery tester.

The cells were cycled at different current densities, i.e., 0.05 C, 0.1 C, 0.2 C, 0.5 C, 1 C, 2 C, 5 C, 10 C, 20 C, and 30 C, in which 1 C relates to extracting 170 $mAg^{-1}$ in an hour. The cells demonstrated unexpectedly stable storage capacity as shown in Table 2. For example, $LiMn_{0.5}Fe_{0.5}PO_4$ cells achieved a storage capacity of 157 mAh $g^{-1}$ at 0.1 C and 45 mAh $g^{-1}$ at 30 C.

The cells also demonstrated unexpectedly high energy density, which is shown in Table 3. For examples, the observed energy density of $LiMn_{0.2}Fe_{0.8}PO_4$ particles, $LiMn_{0.5}Fe_{0.5}PO_4$ particles, and $LiMn_{0.8}Fe_{0.2}PO_4$ particles all exceeded the theoretical values for $LiCoO_2$ (the most widely used cathodic material for lithium ion batteries) and $LiFePO_4$ (a promising substitute for $LiCoO_2$).

In addition, the cells were subject to galvanostatic charge-discharge cycling tests. The results of these tests showed that the high potential and the flat potential vs. Li/Li+ occurred at about 4.1 V and 3.45 V, respectively, which represented a gain of 0.6-0.7 V at the high potential compared to $LiFePO_4/C$ cathode material.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A process of preparing nano-composite $LiMn_{1-x}Fe_xPO_4$ particles, the process comprising:
providing a solvent containing a soft-template compound, a lithium ion-containing compound, an iron ion-containing compound, a manganese ion-containing compound, and a phosphate ion-containing compound;
removing the solvent to obtain a $LiMn_{1-x}Fe_xPO_4$ precursor;
calcining the $LiMn_{1-x}Fe_xPO_4$ precursor to obtain crystalline $LiMn_{1-x}Fe_xPO_4$ grains;
milling the crystalline $LiMn_{1-x}Fe_xPO_4$ grains in the presence of conductive carbon to obtain nanostructured $LiMn_{1-x}Fe_xPO_4/C$ particles; and
annealing the nanostructured $LiMn_{1-x}Fe_xPO_4/C$ particles to obtain nano-composite $LiMn_{1-x}Fe_xPO_4/C$ particles,
wherein $0 \leq x \leq 1$; the amounts of the lithium ion-containing compound, the ferrous ion-containing compound, the manganese ion-containing compound, and the phosphate ion-containing compound are in stoichiometric proportion; and the weight ratio of the soft-template compound to the lithium ion-containing compound is 1:1 to 10:1.

2. The process of claim 1, wherein x is 0, 0.2, 0.5, or 0.8.

3. The process of claim 1, wherein the soft-template compound is (1-dodecyl)-trimethylammonium bromide, (1-hexadecyl)trimethylammonium bromide, octadecyltrimethyl-ammonium bromide, tetradecyltrimethylammonium bromide, decyltrimethylammonium bromide, octyl trimethylammonium bromide, or pluronic F-127; and the solvent is a mixture of ethanol and water, in which the weight ratio of ethanol to water is 1:1 to 6:1.

TABLE 2

Storage performance of mesoporous nano-composite $LiMn_{1-x}Fe_xPO_4/C$ particles

| Mesoporous nano-composite | C rates |  |  |  |  |  |  |  |  |  |
|---|---|---|---|---|---|---|---|---|---|---|
|  | 0.05 C | 0.1 C | 0.2 C | 0.5 C | 1 C | 2 C | 5 C | 10 C | 20 C | 30 C |
|  | Storage performance of $LiMn_{1-x}Fe_xPO_4/C$ (x = 0, 0.2, 0.5 and 0.8) mAh · $g^{-1}$ | | | | | | | | | |
| $LiMn_{0.2}Fe_{0.8}PO_4$ | 168 | 155 | 146 | 134 | 128 | 115 | 94 | 72 | 48 | 40 |
| $LiMn_{0.5}Fe_{0.5}PO_4$ | — | 157 | 155 | 145 | 134 | 123 | 100 | 83 | 52 | 45 |
| $LiMn_{0.8}Fe_{0.2}PO_4$ | — | 162 | 158 | 154 | 147 | 129 | 108 | 88 | 50 | 44 |
| $LiMnPO_4$ | 140 | 120 | 97 | 95 | 61 | 41 | 20 | — | — | — |

TABLE 3

Specific energy of $LiMn_{1-x}Fe_xPO_4$, $LiFePO_4$ and $LiCoO_2$

| Mesoporous nano-composite materials | Specific energy, Wh · $kg^{-1}$ | |
|---|---|---|
|  | Theoretical specific energy | Observed specific energy |
| $LiMn_{0.2}Fe_{0.8}PO_4/C$ | 609 | 666 at 0.05 C, 554 at 0.1 C |
| $LiMn_{0.5}Fe_{0.5}PO_4/C$ | 643 | 592 at 0.1 C |
| $LiMn_{0.8}Fe_{0.2}PO_4/C$ | 678 | 643 at 0.1 C |
| $LiMnPO_4/C$ | 701 | 574 at 0.05 C, 492 at 0.1 C |
| $LiFePO_4/C$ | 586 | Not measured |
| $LiCoO_2/C$ | 561 | Not measured |

4. The process of claim 3, wherein the lithium ion-containing compound is lithium dihydrogen phosphate, lithium acetate, lithium carbonate, lithium hydroxide, or lithium nitrate; the iron ion-containing compound is iron (II) acetate, iron (III) nitrate, iron (III) acetyl acetonate, iron (III) chloride, or iron (II) oxalate; the manganese ion-containing compound is manganese (II) acetate, manganese (III) nitrate, manganese (III) acetyl acetonate, manganese (III) chloride, or manganese (II) oxalate; and the phosphate ion-containing compound is lithium dihydrogen phosphate, ammonium dihydrogen phosphate, or phosphoric acid.

5. The process of claim 4, wherein the lithium ion-containing and phosphate ion-containing compound is lithium dihydrogen phosphate, the iron ion-containing compound is iron (II) acetate, and the manganese ion-containing compound is manganese (II) acetate.

6. The process of claim 5, wherein x is 0, 0.2, 0.5, or 0.8; the $LiMn_{1-x}Fe_xPO_4$ precursor is calcined at 550 to 750° C. for 2 to 12 hours; the crystalline $LiMn_{1-x}Fe_xPO_4$ grains are ball milled at 300 to 600 rpm for 2 to 24 hours; and the nanostructured $LiMn_{1-x}Fe_xPO_4/C$ particles are annealed at 300 to 750° C. for 2 to 12 hours.

7. The process of claim 6, wherein the $LiMn_{1-x}Fe_xPO_4$ precursor is calcined at 600 to 700° C. for 3 to 6 hours, the crystalline $LiMn_{1-x}Fe_xPO_4$ grains are ball milled at 300 to 500 rpm for 2 to 6 hours, and the nanostructured $LiMn_{1-x}Fe_xPO_4/C$ particles are annealed at 500 to 700° C. for 3 to 6 hours.

8. The process of claim 4, wherein x is 0, 0.2, 0.5, or 0.8; the $LiMn_{1-x}Fe_xPO_4$ precursor is calcined at 550 to 750° C. for 2 to 12 hours; the crystalline $LiMn_{1-x}Fe_xPO_4$ grains are ball milled at 300 to 600 rpm for 2 to 24 hours; and the nanostructured $LiMn_{1-x}Fe_xPO_4/C$ particles are annealed at 300 to 750° C. for 2 to 12 hours.

9. The process of claim 8, wherein the $LiMn_{1-x}Fe_xPO_4$ precursor is calcined at 600 to 700° C. for 3 to 6 hours, the crystalline $LiMn_{1-x}Fe_xPO_4$ grains are ball milled at 300 to 500 rpm for 2 to 6 hours, and the nanostructured $LiMn_{1-x}Fe_xPO_4/C$ particles are annealed at 500 to 700° C. for 3 to 6 hours.

10. The process of claim 3, wherein the soft-template compound is (1-hexadecyl)-trimethylammonium bromide or dodecyltrimethylammonium bromide; and the solvent is a mixture of ethanol and water, in which the weight ratio of ethanol to water is 5:1.

11. The process of claim 10, wherein the lithium ion-containing compound is lithium dihydrogen phosphate, lithium acetate, lithium carbonate, lithium hydroxide, or lithium nitrate; the iron ion-containing compound is iron (II) acetate, iron (III) nitrate, iron (III) acetyl acetonate, iron (III) chloride, or iron (II) oxalate; the manganese ion-containing compound is manganese (II) acetate, manganese (III) nitrate, manganese (III) acetyl acetonate, manganese (III) chloride, manganese (II) oxalate; and the phosphate ion-containing compound is lithium dihydrogen phosphate, ammonium dihydrogen phosphate, or phosphoric acid.

12. The process of claim 11, wherein the lithium ion-containing and phosphate ion-containing compound is lithium dihydrogen phosphate, the iron ion-containing compound is iron (II) acetate, and the manganese ion-containing compound is manganese (II) acetate.

13. The process of claim 12, wherein x is 0, 0.2, 0.5, or 0.8; the $LiMn_{1-x}Fe_xPO_4$ precursor is calcined at 550 to 750° C. for 2 to 12 hours; the crystalline $LiMn_{1-x}Fe_xPO_4$ grains are ball milled at 300 to 600 rpm for 2 to 24 hours; and the nanostructured $LiMn_{1-x}Fe_xPO_4/C$ particles are annealed at 300 to 750° C. for 2 to 12 hours.

14. The process of claim 13, wherein the $LiMn_{1-x}Fe_xPO_4$ precursor is calcined at 600 to 700° C. for 3 to 6 hours, the crystalline $LiMn_{1-x}Fe_xPO_4$ grains are ball milled at 300 to 500 rpm for 2 to 6 hours, and the nanostructured $LiMn_{1-x}Fe_xPO_4/C$ particles are annealed at 500 to 700° C. for 3 to 6 hours.

15. The process of claim 11, wherein x is 0, 0.2, 0.5, or 0.8; the $LiMn_{1-x}Fe_xPO_4$ precursor is calcined at 550 to 750° C. for 2 to 12 hours; the crystalline $LiMn_{1-x}Fe_xPO_4$ grains are ball milled at 300 to 600 rpm for 2 to 24 hours; and the nanostructured $LiMn_{1-x}Fe_xPO_4/C$ particles are annealed at 300 to 750° C. for 2 to 12 hours.

16. The process of claim 15, wherein the $LiMn_{1-x}Fe_xPO_4$ precursor is calcined at 600 to 700° C. for 3 to 6 hours, the crystalline $LiMn_{1-x}Fe_xPO_4$ grains are ball milled at 300 to 500 rpm for 2 to 6 hours, and the nanostructured $LiMn_{1-x}Fe_xPO_4/C$ particles are annealed at 500 to 700° C. for 3 to 6 hours.

17. The process of claim 1, wherein the lithium ion-containing compound is lithium dihydrogen phosphate, lithium acetate, lithium carbonate, lithium hydroxide, or lithium nitrate; the iron ion-containing compound is iron (II) acetate, iron (III) nitrate, iron (III) acetyl acetonate, iron (III) chloride, or iron (II) oxalate; the manganese ion-containing compound is manganese (II) acetate, manganese (III) nitrate, manganese (III) acetyl acetonate, manganese (III) chloride, manganese (II) oxalate; and the phosphate ion-containing compound is lithium dihydrogen phosphate, ammonium dihydrogen phosphate, or phosphoric acid.

18. The process of claim 1, wherein $0<x<1$.

* * * * *